United States Patent [19]

Hamaker

[11] 4,373,264
[45] Feb. 15, 1983

[54] INERTIAL GUIDE AND SUPPORT MEANS FOR SABRE SAWS

[76] Inventor: John D. Hamaker, 112 S. Nelson, Potterville, Mich. 48876

[21] Appl. No.: 223,046

[22] Filed: Jan. 7, 1981

[51] Int. Cl.³ .............................................. B27B 19/09
[52] U.S. Cl. .................................................... 30/374
[58] Field of Search ................. 30/374, 375, 376, 392, 30/393, 394

[56] References Cited

U.S. PATENT DOCUMENTS

| | | | |
|---|---|---|---|
| 1,826,187 | 10/1931 | Pickering | 30/374 |
| 2,842,170 | 7/1958 | Bruck | 30/374 |
| 2,868,248 | 1/1959 | Pedersen | 30/374 |
| 3,339,598 | 9/1967 | Frostad | 30/376 |
| 4,334,356 | 6/1982 | Krosunger | 30/374 |

Primary Examiner—Jimmy C. Peters
Attorney, Agent, or Firm—Malcolm R. McKinnon

[57] ABSTRACT

An inertial guide and support particularly adapted for use with sabre saws, the inertial guide and support including a relatively heavy base providing sufficient inertia to hold the sabre saw blade against a workpiece during a portion of the stroke of the blade and also including apparatus located adjacent the workpiece for supporting and guiding the saw blade while permitting rocking of the blade relative to the workpiece whereby the cutting efficiency and workpiece thickness range of the sabre saw are increased while vibration and operator fatigue are reduced during operation of the sabre saw.

15 Claims, 6 Drawing Figures

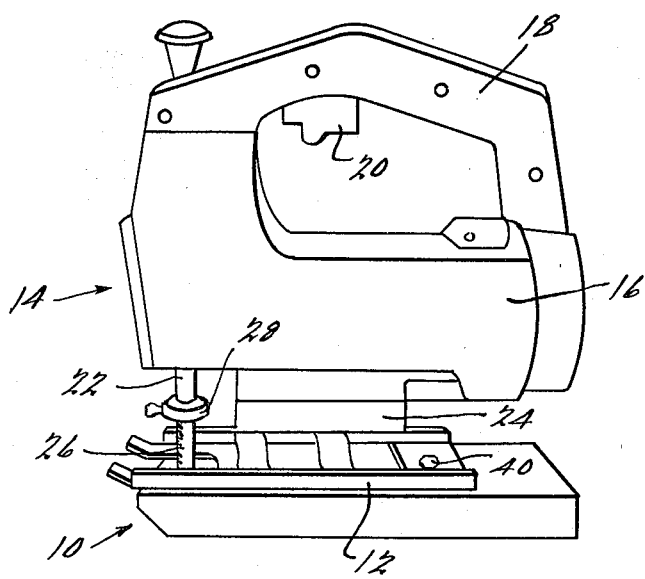
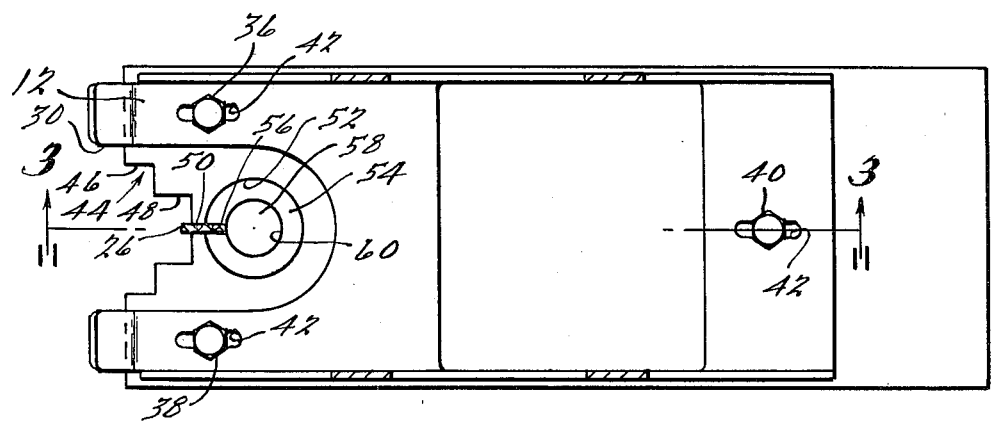

INERTIAL GUIDE AND SUPPORT MEANS FOR SABRE SAWS

BRIEF SUMMARY OF THE INVENTION

This invention relates to sabre saws, and, more particularly, to an improved inertial guide and support means particularly adapted for use with conventional sabre saws. As is well known in the art, conventional sabre saws include a motor, such as an electric motor, a reciprocal blade actuator driven by the motor, a relatively thin, lightweight, and generally flat workpiece engaging base plate, and a replaceable sabre-like saw blade which is releasably and cantileverly connected to the blade actuator and which extends perpendicularly beyond the plane of the lower surface of the base plate whereby the saw blade is positioned to cut a workpiece located adjacent the base plate. U.S. Pat. Nos. 2,842,170; 3,303,861 and 3,339,598 illustrate and describe typical and conventional sabre saws of the type with which the present inertial guide and support means embodying the present invention may be utilized, it being understood that the present invention may also be utilized with other conventional sabre saws that are commercially available.

As is understood by those skilled in the art, a workpiece resists penetration of the saw blade during the sawing operation with the result that considerable force is required to prevent the saw teeth from backing away from the workpiece, particularly when sawing hard, tough materials, such as steel. Moreover, the handle structure of conventional sabre saws is such that it is difficult to apply adequate manual force to the saw. In addition, the cantileverly mounted saw blade is supported so far away from the workpiece that the saw blade tends to bend away from the workpiece when the required force is applied thereto with the result that the saw blade tends to kick away from the workpiece and the elastic grip of the operator bounces it back. Cutting efficiency is thus lost through excessive vibration.

An object of the present invention is to overcome disadvantages in prior sabre saws of the indicated character and to provide an improved inertial guide and support means which utilizes the inertia of a relatively heavy base to provide the required force to hold the sabre saw blade teeth against the workpiece for a sufficient length of time to remove chips before backing out of the kerf.

Another object of the present invention is to provide an improved inertial guide and support means incorporating improved means for supporting and guiding a conventional sabre saw blade.

Another object of the present invention is to provide an improved inertial guide and support means which may be easily and quickly attached to a conventional sabre saw base plate or which may be attached directly to the saw housing.

Another object of the present invention is to provide an improved inertial guide and support means for sabre saws which increases the cutting efficiency and the speed of cutting of workpieces by the sabre saw blade.

Another object of the present invention is to provide an improved inertial guide and support means which extends the workpiece thickness range to more than the stroke length and beyond the present recommended cutting thickness of workpieces.

Another object of the present invention is to provide an improved inertial guide and support means for sabre saws which reduces operator stress and fatigue caused by excessive vibration of the sabre saw.

Another object of the present invention is to provide an improved inertial guide and support means for sabre saws which improves the bite of the saw blade into the workpiece and which obtains improved clearance of the chips when a saw with a relatively short stroke is cutting a relatively thick workpiece.

Still another object of the present invention is to provide an improved inertial guide and support means for sabre saws which is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a perspective view of an inertial guide and support means embodying the present invention, showing the same attached to a conventional sabre saw;

FIG. 2 is a sectional plan view of a portion of the structure illustrated in FIG. 1;

FIG. 3 is an enlarged sectional, side elevational view of a portion of the structure illustrated in FIG. 2, taken on the line 3—3 thereof;

DETAILED DESCRIPTION

Figure 4:
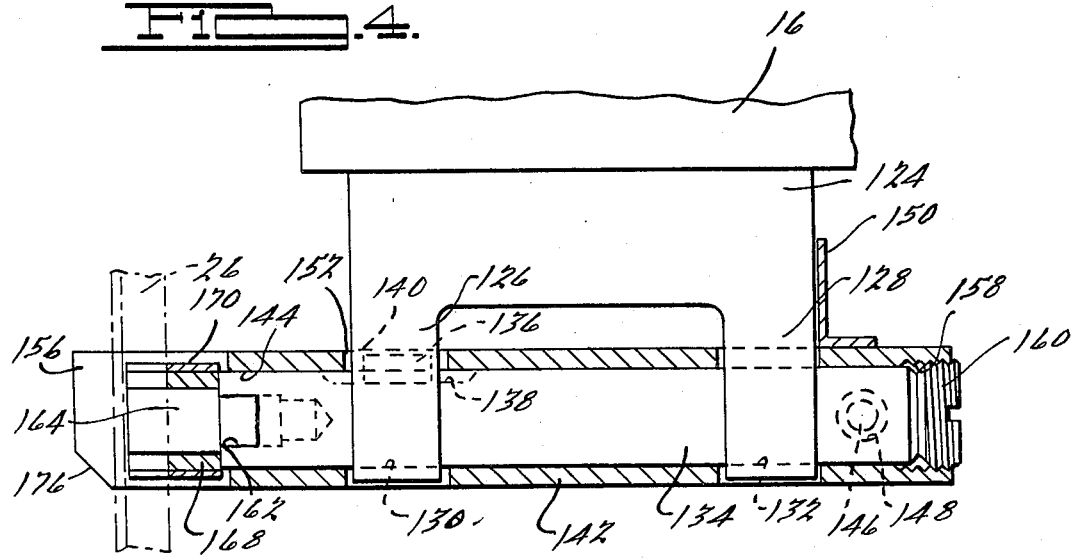
FIG. 4 is a sectional side elevational view of another embodiment of the invention.

Referring to the drawings, one embodiment of the invention is illustrated in FIGS. 1, 2 and 3 thereof, and is comprised of an inertial guide and support means, generally designated 10, which is adapted to be secured to the base plate 12 of a conventional sabre saw, generally designated 14. The sabre saw 14 illustrated in the drawings is intended to depict a wide variety of conventional sabre saws which are commercially available and all of which include a motor housing 16 which houses, for example, a conventional electric motor (not shown); handle means 18 attached to the motor housing 16; switch means 20 controlling the energization of the motor; a reciprocal blade actuator 22 driven by the motor, the relatively thin, lightweight and generally flat workpiece engaging base plate 12 which is supported by the motor housing in spaced relationship with respect thereto through the agency of a support 24; and a replaceable sabre-like saw blade 26 which is releasably and cantileverly connected to the blade actuator 22 by a conventional connector 28. As shown in the drawings, the cantileverly mounted saw blade 26 extends through an opening 30 provided in the forward end portion of the base plate 12, the saw blade extending beyond the plane of the lower surface 32 of the base plate 12 whereby the free end portion of the saw blade 26 is positioned to cut a workpiece located below the base plate 12.

The inertial guide and support means 10 embodying the present invention is comprised of a relatively heavy base 34 which is adapted to be secured to the base plate 12 through the agency of screws such as 36, 38 and 40 which extend through slots, such as 42, in the base plate 12 and threadably engage the base 34. The base 34 is preferably formed of cast iron or steel and preferably has a weight, for example, of approximately three pounds or more. The forward end portion of the base 34 defines a stepped opening, generally designated 44, which is open at the top, bottom and forward end of the base 34. In the embodiment of the invention illustrated in FIGS. 1, 2 and 3, the opening 44 includes a relatively wide section 46 adjacent the forward end of the base, an intermediate section 48 the width of which is less than the width of section 46, and a relatively narrow slot 50 the width of which is slightly larger than the width of the saw blade 26 so that the saw blade can reciprocate in the slot 50. The inner end of the slot 50 communicates with a cylindrical passageway 52 defined by the base 34, the passageway 52 being opened at each end, i.e., at the top and bottom of the base 34. An elongate, generally C-shaped guide member 54 is provided which is preferably formed of porous bronze, high carbon cast iron or hard steel and which is inserted in the passageway 52. The free ends of the C-shaped guide member 54 define a slot 56 that is aligned with the slot 50 defined by the base 34, the width of the slot 56 also being slightly larger than the width of the saw blade so that the saw blade can reciprocate therein.

In order to transmit the inertial force of the base 34 to the blade 26 and the cutting reaction of the blade 26 to the base 34, a cylindrical bearing pin 58 is provided having a drive fit in the central opening 60 defined by the C-shaped guide member 54. The pin 58, which is preferably formed of hard, bearing quality material, such as bearing quality steel, bears against the back edge of the blade 26, the slots 42 permitting adjustment of the base 34 relative to the blade 26. The drive fit of the pin 58 in the central opening 60 of the C-shaped guide member 54 serves to lock the pin 58 in the guide member 54 and also locks the guide member 54 in the passageway 52 defined by the base 34. The length of the pin 58 is preferably less than the thickness of the base 34 so that a pocket 62 is provided which forms a reservoir for lubricant. If desired, a felt or other porous plug 64 may be inserted in the pocket 62 to assist in retaining lubricant therein.

With the above described construction, the manual force applied to the sabre saw is placed next to the workpiece thereby minimizing the factor of blade elasticity. Such a construction also reduces stress in the reciprocating blade actuator 22 and its associated bearings and in the connection 28 between the blade actuator 22 and the saw blade 26. At the same time, the C-shaped guide member 54 also guides the saw blade and substantially prevents lateral deflection of the saw blade from spoiling the cut. It will also be understood that if the pin 58 becomes worn, the pin 58 may be driven out of the passageway 60, rotated angularly a slight amount, and then be driven back into the pasageway 60 so that a fresh surface portion of the pin 58 engages the back edge of the saw blade 26.

In order to concentrate the inertial force on a small number of saw teeth to provide a more efficient cutting action, the lower front edge of the base 34 is chamfered, as at 66, from a point slightly in front of the saw blade 26 so that the saw blade can be rocked forwardly and backwardly as the cutting proceeds. This action results in the blade cutting tangent to a curve rather than against the full thickness of the workpiece with the result that the bite of the blade into the workpiece is improved and at the same time clearance of the chips is permitted when a saw with a relatively short stroke is working in a relatively thick workpiece.

From the foregoing it will be appreciated that the present invention utilizes the inertia of the relatively heavy base 34 to provide sufficient force to hold the blade 26 against the workpiece long enough to remove chips before backing out of the cut. When the base 34 is accelerated away from the cut, the manual force of the hand and arm of the operator reverses the direction of movement of the base and returns it to the cutting position by the time the blade has made its return stroke. The timing of these events is a matter of matching the speed of reciprocation of the blade with the natural frequency with which the base and the operator's arm function. With a variable speed saw, the optimum speed can be quickly found by the operator. A single speed saw can generally be slowed to the optimum speed by increasing the forward pressure applied to the saw blade.

While the base 34 has been illustrated and described in FIGS. 1, 2 and 3 as being attached to the conventional base plate 12 of a conventional sabre saw, it will be understood that the base plate 12 could be eliminated and the base 34 connected directly to the housing by a suitable support means which makes provision for adjustment of the guide means relative to the saw blade.

The embodiment of the invention illustrated in FIGS. 1, 2 and 3 is particularly useful for cutting metals, and since there is seldom a need for cutting at an angle other than 90 degrees to the base, no provision has been made in the embodiment of the invention illustrated in FIGS. 1 through 3 for angle cutting.

Figure 5:
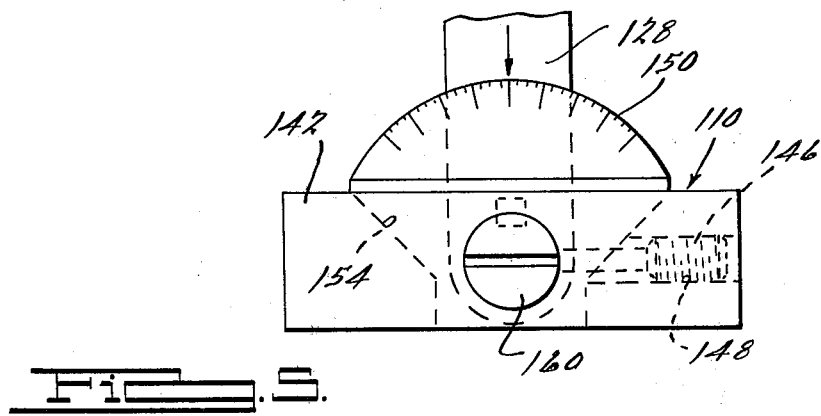
FIG. 5 is an end view of the structure illustrated in FIG. 4.
Figure 6:
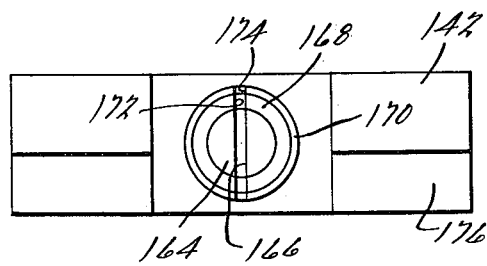
FIG. 6 is a front elevational view of a portion of the structure illustrated in FIG. 4.

Another embodiment of the invention is illustrated in FIGS. 4, 5 and 6 and is comprised of an inertial guide and support means, generally designated 110, wherein provision is made for angle cutting. In this embodiment of the invention, the base plate 12 and support 24 are eliminated, and a yoke-type support 124 is provided which is fixed to the sabre saw motor housing 16 and projects downwardly therefrom. The support 124 includes longitudinally spaced, downwardly projecting legs 126 and 128 defining openings 130 and 132, respectively, adapted to receive a longitudinally extending shaft 134 which is rotatably fixed in relation to the support 124 through the agency of a key 136 having a sliding fit in a keyway 138 provided in the shaft 134 and a keyway 140 provided in the leg 126 of the support 124 whereby the shaft 134 is permitted to move longitudinally relative to the support 124 but is rotatably fixed relative to the support 124. A relatively heavy base 142 is provided which is generally rectangular in plan and elevational views, and which defines a longitudinally extending passageway 144 adapted to receive the shaft 134 whereby the base is mounted for angular movement relative to the shaft 134. The base 142 is preferably formed of cast iron or steel and preferably has a weight, for example, of approximately 3 pounds or more. A set screw 146 is provided which threadably engages an internally threaded passageway 148 defined by the base 142, the inner end of the set screw 146 being adapted to engage the shaft 134 to hold the base in the desired angular position relative to the shaft 134.

In this embodiment of the invention, a protractor type scale 150 is provided which is fixed to the base and moves therewith, the scale 150 being provided with suitable indicia whereby the angular position of the base relative to the shaft 134 and associated support 124 is readily indicated.

The portions of the base 142 adjacent the legs 126 and 128 define angularly disposed channels 152 and 154 on each side thereof which provide clearance for the base to move angularly relative to the legs 126 and 128 and at the same time limit longitudinal movement of the base relative to the support 124. The forward end portion of the base defines an opening 156 which is open at the top, bottom and forward end of the base to provide clearance for the saw blade 26 when the base is angularly disposed with respect to the saw blade.

The rear end portion of the passageway 144 is provided with an internal thread 158 adapted to receive an adjustable screw stop 160 which bears against the adjacent end of the shaft 134 whereby when the set screw 146 is loosened, the shaft 134 may be moved forwardly in the passageway 144 by advancing the screw stop 160 into the passageway 144.

In order to transmit the inertial force of the base 142 to the blade 26 and the cutting reaction of the blade 26 to the base 142, the forward end portion of the shaft 134 is provided with a recess 162 which is open at the forward end of the shaft 134 and which is adapted to receive, with a press fit, a generally cylindrical guide member 164 which is preferably formed of hard bearing quality material, such as bearing quality steel and which defines a vertically disposed slot 166 adapted to receive the saw blade 26, the width of the slot 166 being slightly larger than the width of the saw blade so that the blade can reciprocate therein. The guide member 164 bears against the back edge of the blade 26 to transmit the inertial force of the base to the blade and the cutting reaction of the blade to the base while the adjustable stop 160 enables the shaft 134 and guide member 164 to be moved forwardly to take up for wear of the guide member.

In this embodiment of the invention, a felt ring 168 is provided for the purpose of retaining a suitable lubricant, the felt ring 168 being retained by a steel sleeve 170 circumposed on the felt ring 168. Both the felt ring 168 and the steel sleeve 170 define slots 172 and 174, respectively, which are aligned with the slot 166 in the guide member 164 so that the saw blade 26 can reciprocate in such slot.

With the above described construction, the base 142 may be angularly adjusted relative to the saw blade 26 for angle cutting, the base 142 being locked in the selected angularly adjusted position through the agency of the set screw 146. Also with the above described construction, the manual force applied to the sabre saw is placed next to the workpiece thereby minimizing the factor of blade elasticity. Such a construction also reduces stress in the reciprocating blade actuator and its associated bearings and in the connection between the blade actuator and the saw blade 26. At the same time, the guide member 164 also guides the saw blade and substantially prevents lateral deflection of the saw blade from spoiling the cut. If the guide member 162 becomes worn, the adjustable stop 160 may be advanced in the passageway 144 to maintain the guide member 164 against the back edge of the saw blade 26.

In order to concentrate the inertial force on a small number of saw teeth to provide a more efficient cutting action, the lower front edge of the base 142 is chamfered, as at 176, from a point slightly in front of the saw blade 26 so that the saw blade can be rocked forwardly and backwardly as the cutting proceeds. This action results in the blade cutting tangent to a curve rather than against the full thickness of the workpiece with the result that the bite of the blade into the workpiece is improved and at the same time clearance of the chips is permitted when a saw with a relatively short stroke is working in a relatively thick workpiece.

From the foregoing it will be appreciated that this embodiment of the invention also utilizes the inertia of a relatively heavy base to provide sufficient force to hold the saw blade 26 against the workpiece long enough to remove chips before backing out of the cut. When the base 142 is accelerated away from the cut, the manual force of the hand and arm of the operator reverses the direction of movement of the base 142 and returns it to the cutting position by the time the blade has made its return stroke. As previously mentioned, the timing of these events is a matter of matching the speed of reciprocation of the blade with the natural frequency with which the base and the operator's arm function. With a variable speed saw, the optimum speed can be quickly found by the operator while a single speed saw can generally be slowed to the optimum speed by increasing the forward pressure applied to the saw blade.

From the foregoing it will be appreciated that the present invention enables sabre saws to cut much faster in tough hard materials, such as steel. The present invention also extends the ranges of thickness of the workpiece that may be cut to more than the length of the stroke of the saw blade while operator stress due to vibration is greatly decreased.

While preferred embodiments of the invention have been illustrated and described, it will be understood that various changes and modifications may be made without departing from the spirit of the invention.

What is claimed is:

1. An inertial guide and support means for a sabre saw having a housing and a reciprocal saw blade carried by said housing, said inertial guide and support means comprising a relatively heavy base, means attaching said base to said housing, and a guide member associated with said base and bearing against said blade whereby said guide member guides said blade and substantially prevents deflection thereof while transmitting the inertial force of said base to said blade and the reaction of said blade to said base, the portion of said base adjacent said blade being chamfered.

2. An inertial guide and support means for a sabre saw having a housing and a reciprocal saw blade carried by said housing, said inertial guide and support means comprising a relatively heavy base, means attaching said base to said housing, and a guide member associated with said base and bearing against said blade whereby said guide member guides said blade and substantially prevents deflection thereof while transmitting the inertial force of said base to said blade and the reaction of said blade to said base, said base having a weight of at least three pounds.

3. An inertial guide and support means for a sabre saw having a housing and a reciprocal saw blade carried by said housing, said inertial guide and support means comprising a relatively heavy base, means attaching said base to said housing, and a guide member associated with said base and bearing against said blade whereby said guide member guides said blade and substantially prevents deflection thereof while transmitting the inertial force of said base to said blade and the reaction of said blade to said base, said guide member defining a slot adapted to receive said blade, said guide member also including a pin bearing against said blade and locking said guide member to said base.

4. An inertial guide and support means for a sabre saw having a housing and a reciprocal saw blade carried by said housing, said inertial guide and support means comprising, in combination, a relatively heavy base, means attaching said base to said housing for angular movement relative thereto, a guide member associated with said base and bearing against said blade whereby said guide member guides said blade and substantially prevents deflection thereof while transmitting the inertial force of said base to said blade and the reaction of said blade to said base, and means for longitudinally adjusting the position of said guide member relative to said blade, the portion of said base adjacent said guide member being chamfered.

5. An inertial guide and support means for a sabre saw having a housing and a reciprocal saw blade carried by said housing, said inertial guide and support means comprising, in combination, a relatively heavy base, means attaching said base to said housing for angular movement relative thereto, a guide member associated with said base and bearing against said blade whereby said guide member guides said blade and substantially prevents deflection thereof while transmitting the inertial force of said base to said blade and the reaction of said blade to said base, and means for longitudinally adjusting the position of said guide member relative to said blade, a longitudinally extending shaft rotatably fixed relative to said housing, said base being carried by said shaft and being angularly movable relative thereto, said guide member being carried by said shaft.

6. The combination as set forth in claim 5 including means for adjusting the longitudinal position of said shaft relative to said housing and said saw blade.

7. The combination as set forth in claim 6, said base having a weight of approximately three pounds.

8. The combination as set forth in claim 7, said guide member defining a slot adapted to receive said blade.

9. The combination as set forth in claim 8 including lubrication means carried by said guide member.

10. An inertial guide and support means for a reciprocating saw having a housing and a reciprocal saw blade carried by said housing, said inertial guide and support means including a relatively heavy base providing sufficient inertia to hold said saw blade against a workpiece during a portion of the stroke of said blade, said inertial guide and support means also including means located adjacent said blade and supporting and guiding said blade while permitting rocking of said blade relative to a workpiece whereby the cutting efficiency and workpiece thickness range of the reciprocating saw are increased while vibration and operator fatigue are reduced during operation of the reciprocating saw.

11. The combination as set forth in claim 10 wherein the portion of said base adjacent said blade is chamfered.

12. The combination as set forth in claim 10, said base having a weight of approximately three pounds.

13. The combination as set forth in claim 10 including a longitudinally extending shaft rotatably fixed relative to said housing, said base being carried by said shaft and being angularly movable relative thereto, said guide member being carried by said shaft.

14. The combination as set forth in claim 13 including means for adjusting the longitudinal position of said shaft relative to said housing and said saw blade.

15. The combination as set forth in claim 10, said means located adjacent said blade and supporting and guiding said blade including a guide member defining a slot adapted to receive said blade, and pin means bearing against said blade and locking said guide member to said base.

* * * * *